United States Patent [19]

Hsieh et al.

[11] Patent Number: 5,061,457
[45] Date of Patent: Oct. 29, 1991

[54] APPARATUS FOR LIQUID FEED DISPERSION IN FLUID CATALYTIC CRACKING SYSTEMS

[75] Inventors: C. Richard Hsieh, San Rafael; Desmond F. King, El Sobrante; Frederick A. Pettersen, Novato; Cathleen A. Shargay, Pleasant Hill, all of Calif.

[73] Assignee: Chevron Research & Technology Company, San Francisco, Calif.

[21] Appl. No.: 372,480

[22] Filed: Jun. 28, 1989

Related U.S. Application Data

[60] Division of Ser. No. 153,478, Feb. 3, 1988, Pat. No. 4,875,996, which is a continuation of Ser. No. 834,410, Feb. 28, 1986, abandoned.

[51] Int. Cl.⁵ ............................. F27B 15/08; B01J 8/18
[52] U.S. Cl. ..................................... 422/140; 239/489; 239/490; 239/601; 239/591; 422/145; 422/214
[58] Field of Search ............... 422/140, 145, 144, 224, 422/214; 239/466, 489, 490, 601, 591

[56] References Cited

U.S. PATENT DOCUMENTS

| | | | |
|---|---|---|---|
| 2,786,742 | 3/1957 | McKinley et al. | 422/140 |
| 3,275,248 | 9/1966 | O'Brien et al. | 239/466 |
| 4,307,840 | 12/1981 | Schulze et al. | 239/591 X |
| 4,717,334 | 1/1988 | Newman | 239/591 X |
| 4,793,913 | 12/1988 | Chessmore et al. | 422/144 X |
| 4,875,627 | 10/1989 | Coulston et al. | 239/466 |

OTHER PUBLICATIONS

*Fluid Mechanics* R. A. Dodge et al., McGraw Hill Book Co., Inc., New York, 1937, pp. 275-285.
*Hydraulics*, R. L. Dougherty, McGraw Hill Book Co., Inc., New York, 1937, pp. 113-127.
*The Condensed Chemical Dictionary*, 8th Edition, Van Nostrand Reinhold Company, 1971, New York.

*Primary Examiner*—Robert J. Warden
*Assistant Examiner*—Amaha Santiago
*Attorney, Agent, or Firm*—Burns, Doane, Swecker & Mathis

[57] ABSTRACT

Apparatus for liquid feed dispersion in fluid catalytic cracking systems is disclosed wherein an improved fluidized catalytic cracking nozzle assembly having a nozzle unit so constructed that substantially all liquid fed through the unit is converted to mist-sized particles over a wide-angle dispersion pattern, the unit being recessed within a protective pipe having a shield on the inside thereof in the area of the recess, without concurrent addition of steam to affect liquid that may flow therethrough.

6 Claims, 3 Drawing Sheets

APPARATUS FOR LIQUID FEED DISPERSION IN FLUID CATALYTIC CRACKING SYSTEMS

This application is a divisional of application Ser. No. 07/153,478, filed Feb. 3, 1988 now U.S. Pat. No. 4,875,996 issued Oct. 24, 1989, which is a continuation of Ser. No. 06/834,410, filed Feb. 28, 1986, now abandoned.

BACKGROUND OF THE INVENTION

The present invention relates to fluid catalytic cracking of hydrocarbons. More particularly it relates to an improved method of dispersing feed of liquid hydrocarbons into a stream of heated catalyst particles in a riser reactor utilizing an improved fluidized catalytic cracking nozzle assembly to promote catalytic action between the hot catalyst particle surfaces and finely divided liquid drops.

Fluidized catalytic cracking of heavy petroleum fractions is one of the major refining methods to convert crude or partially refined petroleum oil to useful products, such as fuels for internal combustions engines and heating oils. In such fluidized catalytic cracking (FCC), high molecular weight hydrocarbon liquids are contacted with hot, finely divided, solid, catalyst particles in an elongated riser or transfer line reactor. The reactor is usually in the form of a riser tube and the contact time of the material is on the order of a fraction of a second to a few seconds, say one to ten seconds, and generally not over about three seconds. This short contact time is necessary to optimize generation of gasoline and middle distillate fractions. By proper selection of temperatures and reaction times a catalytic cracking reaction is "quenched" so that economically undesirable end products of such a reaction, methane and carbon, are held to a minimum, and yield of desired products, gasoline, and middle distillate oils, is at a maximum. During this short reaction period a hydrocarbon feedstock, frequently in the form of vacuum gas oil, cycle oil, or the like, at an initial temperature of from about 300° F. to 800° F., is sprayed onto catalyst at temperatures in the range of about 1100° F. to 1400° F. The present invention, as noted above is particularly directed to a method and a nozzle assembly having a nozzle unit and a protective pipe for uniformly misting such feed onto the hot catalyst.

Generally the mixture is fluidized partially by steam, but primarily by hydrocarbon gases that evolve by the hydrocarbonaceous feed vaporizing upon contact with the hot catalyst. The reaction of the mixture is one of essentially instantaneous generation of large volumes of gaseous hydrocarbons. The hydrocarbon vapors and catalyst mixture flow out of the riser tube into a separator or disengaging vessel. The spent catalyst is separated primarily by gravity and inertia forces acting on the catalyst in the separator vessel, and passed downwardly through a stripper section for return to a regenerator. Steam also generally flows up through the down-flowing catalyst to assist in stripping hydrocarbon vapor from the spent catalyst. Heat for the process is obtained by burning the coke, primarily carbon, on the spent catalyst by flowing oxygen through a bed of spent catalyst in a regenerator vessel. The regenerated and heated catalyst is then recirculated to the riser reactor. The desired product, hydrocarbon vapor, is recovered overhead from the separator vessel. Generally, this recovery is through one or more cyclone separators connected to a plenum chamber or common piping and directly piped to a distillation column. Vapor flow through the cyclone separators extracts residual or entrained catalyst fines. The catalyst fines are recovered from the cyclone separators through "dip legs" connected to the spent catalyst stripper at the bottom or below the disengaging vessel for return to the generator.

A particular problem in the initial generation of hydrocarbon vapor is that if the hydrocarbon liquid does not directly contact catalyst upon injection into the reactor riser, thermal cracking appears to be favored over the catalytic reaction. Such thermal cracking tends to generate end-products of methane and coke. That is, complete conversion of hydrocarbons in the feed produces gas and coke, rather than desired middle distillate hydrocarbons. Prolonged contact of the unvaporized liquid hydrocarbons with catalyst after discharge into a separation vessel may result in further thermal cracking which tends to favor such end reactions particularly at high velocities. Further, it is essential to such catalytic cracking that hydrocarbon contacting the catalyst be as near vapor as possible because such reaction is primarily a vapor phase reaction.

While it has been proposed heretofore to use misting or fine droplet nozzles in the riser reactor pipe, in general such fine dispersions have been obtained by the use of steam or other vaporizing materials which form a two-phase fluid. A particular problem with such two-phase fluids is that in general they produce a higher pressure drop through the spray nozzles than either fluid phase alone. This is important because pressure drop across the nozzle unit for a given size and a given rate of feed has a significant influence on the size of droplets that can be formed by the nozzle. It is, of course, also undesirable to add additional steam to the hydrocarbon feed. Such added steam must be recovered in the overhead distillation column and generally creates a "sour" water disposal problem, because oxides of sulfur, nitrogen and carbon in the recovered hydrocarbon vapors combine with the water to form acids. In spite of such problems, steam is frequently used primarily because it reduces the hydrocarbon partial pressure and accordingly reduces resistance to vaporization of the feed stream by the catalyst.

In the past various hydrocarbon feed systems having feed nozzles were developed. Unfortunately, none of these provided a hydrocarbon feed system wherein a single liquid stream, with or without steam included therein, is injected into a flowing stream of fluidized catalytic particles and then promptly misted. Such a system and nozzle is disclosed in misted. Such a system and nozzle is disclosed in commonly assigned and U.S. Pat. No. 4,793,913 issued Dec. 27, 1988, the disclosure of which is incorporated herein by reference. In that disclosure the feed is misted by generating a free vortex in the single liquid hydrocarbon stream prior to injection by passing it through a centrifugal acceleration chamber, including vanes, and then releasing the full flow through a sharp or square-edge discharge orifice near the reactor side wall. The orifice is so positioned that the vena contracta (the contraction of the diameter of the cylindrical jet of fluid coming out of the orifice to a cross-section smaller than the orifice) of fluid flowing through the orifice is sufficiently close to the flowing catalyst stream in the riser reactor to maintain its solid-liquid flow form into the catalyst stream. As further disclosed the nozzle orifice is located within the side wall to assure that the liquid stream breaks into a fine mist over a conical pattern well within the catalyst stream. Such mounting assures that the outer surface of the nozzle is not coked by the feed or abraded (with eventual destruction of the metal nozzle) by high velocity catalyst particles made of exceedingly abrasive compounds, such as alumina and/or silica, flowing over the outer surface of the nozzle. The square-edged orifice nozzles have been found highly effective to improve hydrocarbon yields of transportation liquids, such as gasoline, kerosene and jet fuels.

It has subsequently been discovered, however, that such an optimum location of the nozzle orifice and the entire nozzle unit within the riser sidewall carrying the catalyst stream is most effective in a relatively small diameter reactor riser. A more preferred location for relatively large diameter risers is within a protective pipe extending into the riser stream. The protective pipe should be concentric with the nozzle unit for extended life of the nozzle. Such further protection is provided in accordance with the present invention by positioning the nozzle, including its discharge orifice, so that the entire assembly is mounted within an opening in the riser sidewall. Unfortunately, it has been discovered that such a nozzle creates a self-destructive eddy current from the stream of high-velocity particles within the sidewall or a protective pipe which first erodes away the surface of the interior of the opening or protective pipe and then the improved nozzle. It is therefore highly desirable to have some way of locating such a nozzle unit for optimum efficiency while at the same time protecting such a nozzle unit and associated structure from destructive eddy currents. The instant invention provides a solution to that problem by providing the combination of a nozzle unit having a square-edged orifice and a special protective pipe or shroud having an abrasion resistant surface on the inside of the pipe so that it surrounds the flow stream, including the vena contracta from the orifice, along with an improved method of use thereof.

SUMMARY OF THE INVENTION

The purpose of the instant invention is to provide an improved method of dispersing feed of liquid hydrocarbons into a stream of heated catalyst particles in a riser reactor utilizing a fluidized catalytic cracking nozzle assembly that will afford excellent conversion of heavy hydrocarbons to transportation liquids and that will not be eroded away by high velocity catalyst particles associated with liquid flow through the nozzle.

To accomplish this purpose there is provided an FCC nozzle assembly in which the nozzle discharge is through a sharp or square-edge orifice capable of creating a vena contracta of the discharged liquid, with the nozzle unit recessed within a protective pipe a distance such that the vena contracta and subsequent wide angle dispersion pattern of liquid flowing through the orifice disperse the discharged liquid without impinging against the inside of the protective pipe, the pipe having shield means formed on the inside thereof to protect the inside of the pipe from eddy currents of liquid and high velocity catalyst particles created in the space between the pipe and the vena contracta of such liquid flow.

Accordingly, a first aspect of the present invention provides a fluidized catalytic cracking nozzle assembly comprising:

a nozzle unit having a liquid hydrocarbon feed conduit, a discharge orifice and a swirl chamber positioned therebetween, said discharge orifice having a square-edge capable of creating a vena contracta of liquid that may flow therethrough that is smaller in cross-sectional area than the area of said orifice without concurrent addition of steam to affect liquid that may flow therethrough, a plurality of vanes between said feed conduit and said chamber for imparting centrifugal rotation to liquid that may flow therethrough, said discharge orifice being smaller in diameter and substantially shorter in length than said swirl chamber, both said orifice and said chamber being open for full flow throughout the full cylindrical volumes thereof; and a protective pipe concentric with said nozzle unit, the discharge orifice of said unit being recessed within said pipe a distance such that the vena contracta and subsequent wide angle dispersion pattern of liquid that may flow through said orifice disperse the discharged liquid without impinging against the inside of the protective pipe, said pipe having shield means on the inside thereof to protect the inside of the pipe from induced eddy currents of catalyst particles around the length of the vena contracta within said pipe.

A second aspect of the present invention provides an improved fluid catalytic hydrocarbon cracking system having heated catalyst circulated through a riser reactor tube for contact with a liquid hydrocarbon feed, with or without water or steam forming a part of said feed, to improve atomization and/or vaporization by reducing the hydrocarbon partial pressure of said feed, the improvement comprising:

a nozzle unit for supplying said hydrocarbon feed into a stream of heated catalyst particles, said unit having a liquid hydrocarbon feed conduit, a discharge orifice and a swirl chamber positioned therebetween, a plurality of vanes between said feed conduit and said chamber for imparting centrifugal rotation to liquid that may flow therethrough, said discharge orifice being smaller in diameter and substantially shorter in length than said swirl chamber and having a square-edge capable of creating a vena contracta of liquid that may flow therethrough that is smaller in cross-sectional area than the area of said orifice without concurrent addition of steam to affect liquid that may flow therethrough, both said orifice and said chamber being open for full flow throughout the full cylindrical volumes thereof; and a protective pipe extending into said riser concentric with said nozzle unit, said unit including said discharge orifice being recessed within the protective pipe so that the vena contracta and subsequent wide angle dispersion pattern of liquid flowing from said orifice disperse the discharged liquid without impinging against the inside of the protective pipe, said pipe having shield means on the inside thereof to protect the inside of said pipe and said nozzle.

A third aspect of the present invention provides a method for liquid feed dispersion in a fluid catalytic hydrocarbon cracking system wherein heated catalyst is circulated through a riser reactor tube for contact with a liquid hydrocarbon feed, with or without water or steam forming a part of said feed, to improve atomization and/or vaporization by reducing the hydrocarbon partial pressure of said feed, comprising the steps of:

introducing said liquid hydrocarbon feed as an unconfined single fluid stream into said riser reactor tube to contact a stream of heated catalyst particles flowing therethrough by first imparting centrifugal rotation to a single liquid phase stream of hydrocarbon to form a free vortex about its axis of flow, said centrifugal rotation being imparted solely by flow of said liquid phase stream through a cylindrical chamber positioned in line with and as a cylindrical extension of a conduit supplying said feed to said riser reactor;

passing said single phase liquid hydrocarbon feed stream during said free vortex rotation through a square-edged orifice having a diameter less than the diameter of said chamber and having a throat substantially shorter than said orifice diameter without assistance from a separate coaxial flow of steam to confine or disperse said steam;

maintaining the hydraulic pressure of said fluid feed stream flowing through said supply line sufficiently to retain a generally cylindrical form of the vena contracta created by free flow from said orifice into said reactor tube before dispersion of said feed into a uniform mist of liquid drops over a substantially uniform conical volume for contact with said stream of heated catalyst particles flowing through said riser;

concentrically surrounding said square-edged orifice and the vena contracta of said fluid stream with a protective pipe such that the vena contracta and subsequent wide angle dispersion pattern of fluid flowing from the orifice disperse the discharge liquid without impinging against the inside of the protective pipe; and protecting the inner surface of said pipe and said nozzle against eddy currents of catalyst particles that may be created in the annular space between the pipe and the vena contracta of said fluid stream by providing shield means extending outwardly from the nozzle orifice toward said riser pipe on the inner surface of said pipe.

DESCRIPTION OF THE PREFERRED EMBODIMENT

Figure 1:
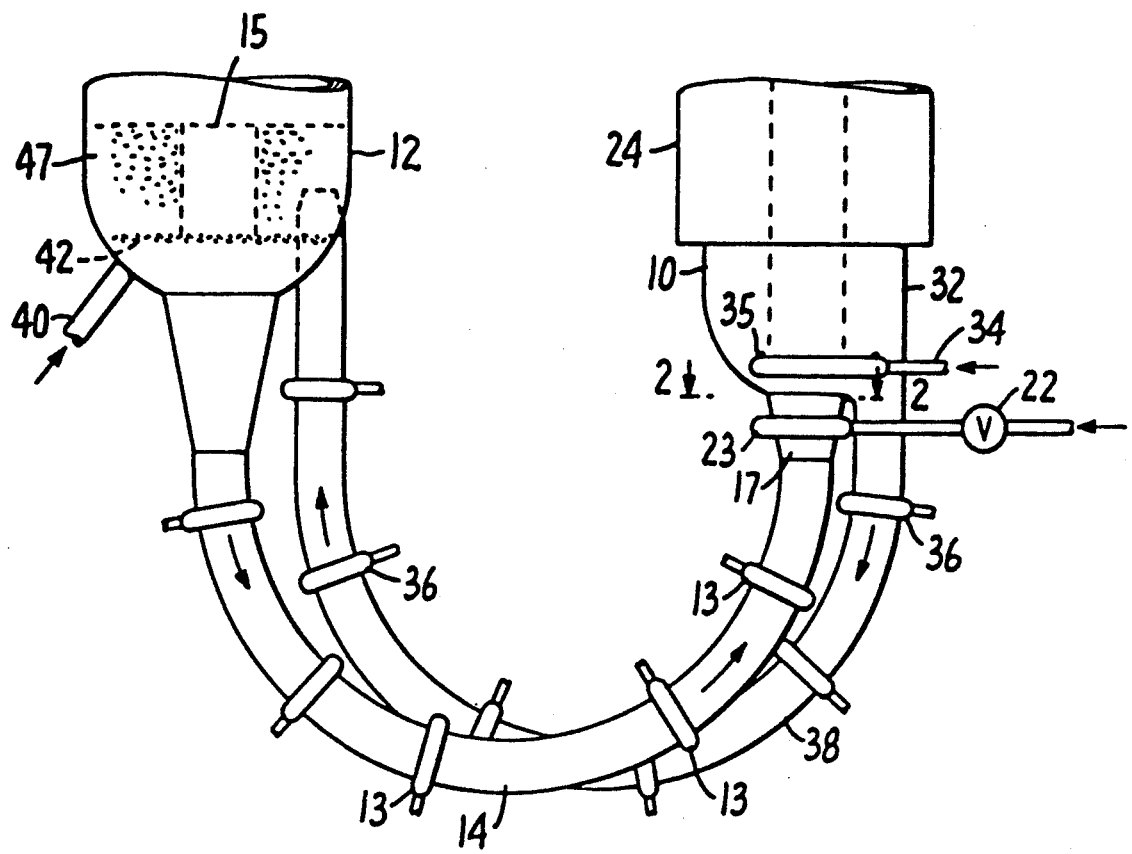
FIG. 1 is a side view of the lower portion of a fluid catalytic cracking system to which the feed nozzle assemblies of the present invention have been applied and generally indicates a riser reactor to which heated catalyst is supplied from a regenerator and the return line for spent catalyst flowing from the separator vessel back to the regenerator.

Previously mentioned U.S. Pat. No. 4,793,913 discloses a catalytic cracking unit to which the present invention has been applied. The system generally comprises a riser reactor pipe 10 in which heated catalyst supplied from a regenerator 12 is reacted with liquid hydrocarbons. Catalyst flows from a regenerator 12 to a riser pipe 10 through a U-tube 14. Catalyst is partially fluidized in the U-tube 14 by gas, preferably steam, which is supplied by a series of nozzle rings 13 along the length of the U-tube. The steam entrains and assists fluidization of catalyst particles supplied by gravity from intake 15 in the regenerator 12 and conveys them to the riser pipe 10.

Figure 2:
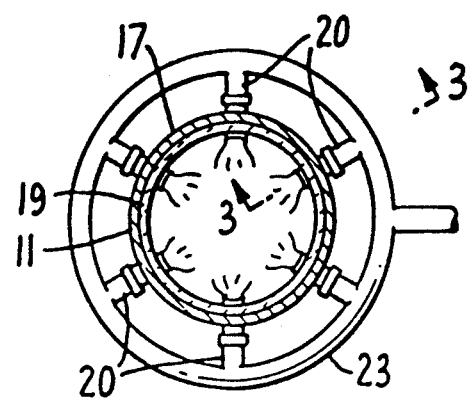
FIG. 2 is a cross-sectional view taken along section lines 2—2 in FIG. 1 which illustrates an arrangement of a plurality of feed nozzle assemblies constructed in accordance with the present invention for flowing hydrocarbon feed from a circular header through the plurality of nozzle assemblies distributed around the riser reactor.
Figure 4:
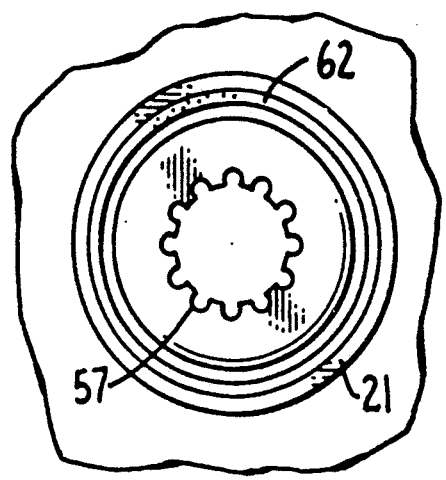
FIG. 4 is an end elevation view of the assembly of FIG. 3 illustrating a square-edge orifice having an undulating peripheral throat to form a distribution pattern of liquid particles after passage through the reduced area of the vena contracta resulting from flow through such orifice.

A stream of hydrocarbon liquid is supplied to the riser pipe 10 by a line under control of valve 22. As indicated in FIG. 2, the line may supply a ring of feed nozzle assemblies 20 connected to an annular header 23. Because the catalyst particles are on the order of 20 to 120 microns in diameter it is important that liquid feed from the line and header 23 be as evenly distributed as possible and in proper droplet size for intimate contact and substantially instantaneous vaporization of the liquid droplets. This is essential because the vaporphase catalytic reaction time to generate desired lowboiling-range liquid by contact between hot catalyst particles and hydrocarbon liquid droplets is on the order of 1 to 10 seconds; more properly, a reactiontime range of 1 to 3 seconds and frequently about 1 second, as required for optimum catalytic reaction to generate middle distillate hydrocarbons rather than to form gas and coke.

Substantially instantaneous reaction of misted hydrocarbon droplets with heated catalyst particles generates large volumes of hydrocarbon vapor which primarily fluidizes the circulation system and carries the mixture upward through the reactor riser pipe 10 for prompt discharge and separation in a separator vessel 24. The reacted hydrocarbon vapor and catalyst are separated in the upper portion of the vessel 24 in the manner described in commonly assigned U.S. Pat. No. 4,500,423, issued Feb. 19, 1985 and U.S. Pat. No. 4,414,100, issued Nov. 8, 1983 and U.S. Pat. No. 4,591,427, issued May 27, 1986. The disclosures of these patents and application, relating to the overall structures and arrangements of suitable fluid catalytic cracking systems to which the present invention may be applied, are incorporated herein by reference. As disclosed in said patents and application, the catalyst is released or discharged from riser pipe 10 and by inertia and gravity effects the catalyst is separated from the vapor. The spent catalyst is recovered in a stripping section, indicated as 32, at or in the lower end of vessel 24. The generated vapor is recovered overhead and condensed in a distillation column (not shown).

Catalyst recovered in the separation process contains a certain amount of residual hydrocarbons in the form of coke, primarily carbon, adhering to the spent catalyst. Such carbon or coke laden spent catalyst is returned to regenerator 12 through stripper means 32. Residual hydrocarbon vapor is removed from the spent catalyst in stripper 32 by introduction of steam, such as by line 34, feeding nozzles 35 at the lower end of stripper 32. Stripper 32 generally includes a plurality of baffles or sheds (not shown) to prolong residence time of the spent catalyst therein. Catalyst is assisted in returning to regenerator 12 by introduction of steam through a series of nozzle rings 36 along return U-tube 38. Spent catalyst is regenerated by addition of oxygen, as by line 40, to burn residual coke, from the catalyst particles supported for oxidation on grid 42. This supplies heat to the catalyst that circulates in the system and returns to riser 10 from bed 47 through intake 15. Off-gas from the burned coke is vented from regenerator 12 through cyclones and flue pipe (not shown).

The present invention is particularly concerned with a method of vaporizing liquid hydrocarbon feed as rapidly as possible in a riser reactor 10 so that the essential reaction of vaporized hydrocarbons in gas-phase with the catalyst particles may proceed as the mixture flows through the riser 10 in the allotted time of 1 to 10 seconds, and most preferably in the range of 1 to 3 seconds. Further, the present invention is concerned with the protection of the nozzle assembly from the interaction of the liquid hydrocarbon feed and the abrasive catalyst particles.

For such short reaction time it is essential that all the liquid feed be substantially instantaneously converted to gas to effect the necessary catalyst-gas phase reaction. Such reaction cracks the heavier hydrocarbon molecules to the desired middle boiling range hydrocarbons. To achieve such prompt gasification the flow pattern of the liquid feed into the fluidized catalyst stream must be uniform both as to droplet size and distribution at reasonable, commercially-available, flow rates and pressures. Further, nozzles for creating such patterned flow must be capable of extended service without plugging (as by formation of coke from the hot hydrocarbon flowing through it) or mechanical wear (erosion as by abrasion of the fluidized catalyst particles). The instant invention provides a nozzle assembly having a nozzle unit and a protective pipe having shield means on the inside thereof, the assembly creating the pattern flow without plugging or mechanical wear.

Figure 3:
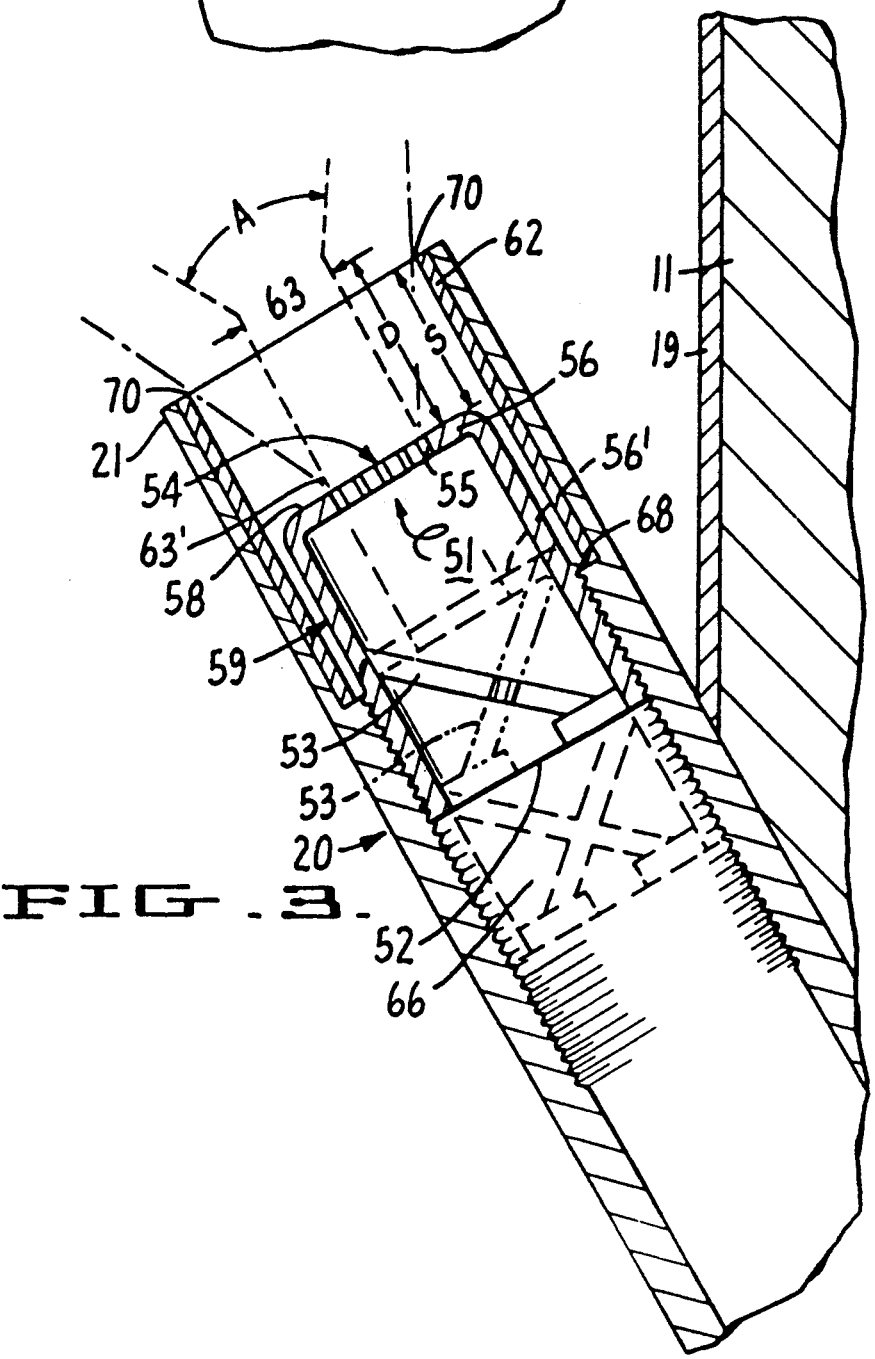
FIG. 3 is a cross-sectional view of the nozzle assembly of the instant invention taken along cross-sectional lines 3—3 in FIG. 2 connected to the wall of a riser reactor. An extreme recess position for the nozzle unit and resulting vena contracta and dispersion pattern are shown in phantom.

Although it has been proposed heretofore to use steam or water as the primary dispersing fluid for atomizing the flow of hydrocarbon feed, superior results without the addition of large volumes of steam can be obtained in accordance with the instant invention by the use of a nozzle having a single swirl chamber, acting as a helical or centrifugal acceleration compartment to form a free vortex between the full flow liquid feed line and a short reduced-area sharp-edged orifice formed in the discharge end of the swirl chamber. For this purpose, as shown in FIG. 3, swirl or free vortex chamber 51 is substantially the same diameter as the full bore of the flow nozzle assembly shown generally at 20. Preferably, nozzle assembly 20 has a nozzle unit 59 which is recessed from the flow path of the reactor riser 10, as in transition section 17 as seen in FIG. 1, within a protective pipe 21 which is connected to the wall 11 and insulation-abrasion layer 19. As indicated, full flow output through orifice 54 is particularly well suited to this function because the fluid does not disperse until the break-up pattern, also referred to as the dispersion zone: or pattern, is well within the catalyst flow path, as in transition section 17, outside of the protective pipe 21. It is also within the scope of the invention to have the dispersion pattern originate within the protective pipe 21 as seen in phantom without impinging against the inside of the protective pipe. As noted above such action is provided by forming a free vortex in the fluid prior to entry into the chamber 51 and by releasing such free vortex through a short, square- or sharp-edged orifice noted generally at 54 to form the vena contracta, characteristic only of such an orifice, so that full fluid flow extends from the recessed position of the orifice 54 in the protective pipe 21 through and into the interior of the riser pipe. The pitch of vanes 53 to form such a free vortex, the size and length of the chamber 51 relative to the diameter and the depth or length of orifice 54 are selected to control the angle of dispersion from the nozzle 20 so that the break-up or dispersion pattern beyond the vena contracta creates properly sized droplets within the riser 10.

Further, to maintain the vena contracta of adequate length of say, ½ to 2 inches, it is important to assure that virtually all hydraulic energy is available to the hydrocarbon feed through nozzle and supply line assembly 20 and is maintained. Such energy is also important to generate the helical or centrifugal action creating a free vortex of the feed so that full break-up of the stream disperses it into a wide-angled conical mist-like spray of droplets. For such a flow pattern, a single pair of deflection vanes 53 are disposed transverse and angled to the axis of flow through nozzle unit 59 of the nozzle assembly 20. Vanes 53, which generate the free vortex rotation, or helical motion, of liquid flowing therethrough, create such a vortical pattern. These vanes may have a pitch of from 15° to 45° to the axis of the feed line end chamber 51. Preferably, the pitch angle is from 25° to 35° and most preferably about 30°. With vanes 53 so angled, the two flow areas 52 may be made with a combined area substantially equal to the flow area of exit orifice 54. This permits full pressure of the feed line to be applied to the rotation of the stream in chamber 51 and subsequent release of the liquid in the required pattern.

As indicated swirl or centrifugal action is transverse and circular to the direction of flow and results in full rotation of the entire flow coming through the nozzle unit prior to exit through the reduced diameter of the orifice surface or throat 55 of the orifice 54.

While orifice 54 is shown as having an undulating peripheral throat of daisy-shaped serrations 57 in the outer cylindrical surface 58 of the end wall 56, the area may include various other configurations such as but not limited to a single circular cylindrical opening but maintaining a sharp edge for passage of fluid. The outlet area from chamber 51, defined by the inner surface of end wall 56, is substantially perpendicular to orifice 54 so that at normal feed rates the square or sharp edge forms the desired reduced area of the vena contacta 63 in the feed stream. As indicated, orifice surface or throat 55 as seen in FIG. 3 is only long enough relative to swirl chamber 51 to form and maintain the vena contracta over a distance sufficient to permit orifice 54 to be recessed within the protective pipe 21 without interfering with the desired wide angle conical dispersion pattern within the riser reactor. In practice the angle "A" of the apex of such a conical or parabolic volume should be in excess of 90° and preferably about 120° as indicated in FIG. 3.

As mentioned earlier, FIG. 3 also illustrates a generally extreme recess position for the nozzle unit in phantom wherein the end wall 56' and the entire nozzle unit is recessed within the protective pipe a distance such that the vena contracta 63' and subsequent wide angle dispersion pattern of liquid flowing through the unit are believed to optimize the dispersion of the discharged liquid without impinging against the inside of the protective pipe. It can be seen that the dispersion pattern clears the edges 70 of the shield means 62. This extreme recess position is believed to be the preferred position for the nozzle unit. In this recessed position the dispersion pattern is believed to substantially reduce detrimental eddy currents of catalyst and fluid from being created within the confines of the protective pipe 21. It is understood that it is well within the scope of the invention to position the nozzle unit nearer the end of the protective pipe 21 such that the vena contracta 63 and the subsequent dispersion pattern extend completely outside of the protective pipe 21.

Returning to FIG. 2, it can be seen that nozzles 20 may be equally distributed around riser pipe 10. The number may be varied in accordance with the diameter and flow rate of catalyst therethrough and may vary from 1 or 2 to a multiplicity, such as 6 as shown in FIG. 2, or an even greater number, say 12 to 15. As shown, the angle of the nozzle axis is from 20° to 70° relative to the axis of the riser reactor, and more desirably about 30° to 50°, to assist in dispersion of the particles in the direction of catalyst-hydrocarbon mixture flow.

While it is contemplated by the present invention that the entire feed will be a hydrocarbon liquid, it is also expected that steam may be added directly to the feed liquid for the purpose of reducing the partial pressure of hydrocarbon liquid after it enters riser pipe 10. However, it is essential that such steam and hydrocarbon be mixed before the fluid is introduced into nozzle 20 and the mixture rotated together to form a free vortex in chamber 51 for proper dispersion of the feed after transmission into catalyst in riser pipe 10 through the vena contracta formed by orifice 54. This assures minimum pressure drop through the nozzle so that the mixture will not significantly decrease the full flow at the highest available hydraulic pressure to atomize the hydrocarbon feed into liquid droplets of the desired fineness after breakup of the stream from orifice 54. In this way, the desired mist is formed in the riser so that such droplets immediately and completely vaporize upon contact with the heated catalyst particles without need for steam either around or external to the nozzle for confinement or dispersion of the feed.

The full reasons that the present arrangement of the cylindrical swirl chamber and an orifice having both a reduced diameter and a short throat area is so effective in vaporizing the feed in the desired pattern without use of external steam is not fully understood. However, it is believed that the misting action of the nozzle assembly 20 is achieved by virtue of fluid passing from axial flow to circular or centrifugal flow by passage through turning vanes 53 imposing a small pressure drop and having a flow area about equal to the orifice area. Thus, passage of the full feed from the swirl chamber is in the form of a free vortex through a short square-edged orifice which forms a short cylindrical flow section (vena contracta) and then expands over a wide-angled conical section. This pattern is not only effective to create properly sized droplets for rapid conversion to gas by the catalyst but most importantly permits recessing the nozzle unit 59 within the riser sidewall or in a protective pipe 21, extending through the sidewall to avoid both catalyst abrasion and direct heating of the nozzle by the hot catalyst. Because of the rapid expansion of the feed into finely divided particles over a wide-angled conical pattern, highly turbulent gas flow stream is created by the voluminous production of hydrocarbon vapor when the hot liquid droplets contact the hot catalyst.

A major problem, however, encountered by the nozzle unit 59 as described above is that the pattern of vaporized feed created by the nozzle unit is believed to create eddy currents of fluid (liquid and vapor) and abrasive catalyst components around the reduced area of the vena contracta which run contrary to the mainstream and which erode the nozzle and its protective pipe.

Generally, the nozzle unit shown in FIG. 3 has two significant features. First, instead of just having a hollow center, this nozzle unit 59 has turning vanes on the inside ahead of a swirl chamber which changes the direction of liquid flow from a straight to circular motion. The second feature is that the orifice opening which is shown to be daisyshaped as shown at 57 and having a square-edge capable of providing resistance for shearing liquid into fine droplets. It is believed that the combination of these features not only produces the desired fine droplets, but when the nozzle unit is confined within the reactor riser wall or a pipe may create such detrimental eddy currents.

Figure 5:
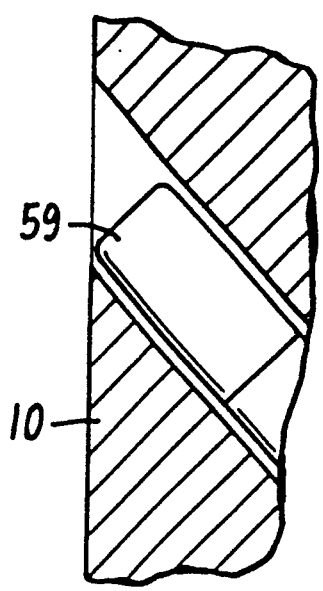
FIG. 5 is a schematic full section view of the installation of a nozzle unit in accordance with prior teachings, wherein the sharp-edged orifice of the nozzle is recessed within the riser sidewall.
Figure 6:
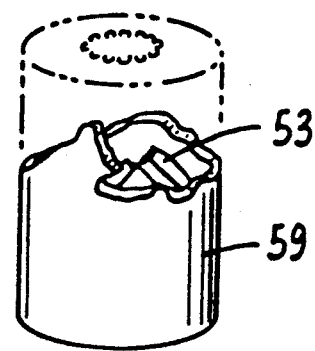
FIG. 6 is a perspective view of a nozzle in accordance with the positioning illustrated in FIG. 5 after the nozzle unit has been badly eroded within the sidewall enclosure, without concentric protection surrounding the vena contracta of the fluid stream flow from the nozzle unit.

With reference to FIGS. 5 and 6, it can be seen that FIG. 5 illustrates the installation of a nozzle unit 59 within the wall of the riser 10. It has been found that in a relatively short period of time that eroding eddy currents created by flow from the nozzle unit erodes the nozzle unit as shown in FIG. 6. In this instance the daisy opening of the nozzle unit 59 has completely disappeared and the nozzle unit has been eroded all the way back to the turning vane 53. Although it is not clear what the total erosion mechanism is, model studies indicate that such erosion is radially outwardly from the face of orifice 57. Further, such tests indicate that if one can protect the tip of the nozzle unit, one would be able to protect the entire nozzle unit 59 from erosion.

Figure 7:
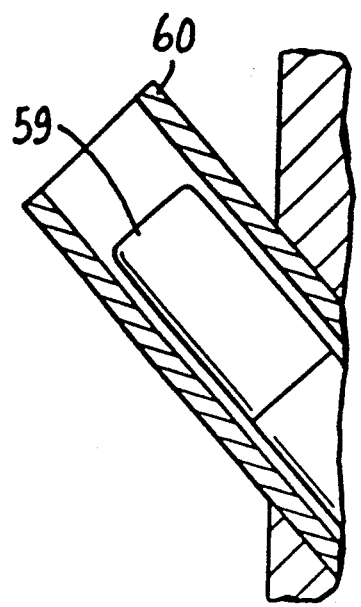
FIG. 7 is a schematic cross-sectional view similar to FIG. 5 wherein a nozzle unit is recessed within a protective pipe.

FIG. 7 illustrates the mounting of the nozzle unit 59 within a protective pipe 60, the nozzle unit 59 being recessed with respect to the end of the shroud or protective pipe 60.

Figure 8:
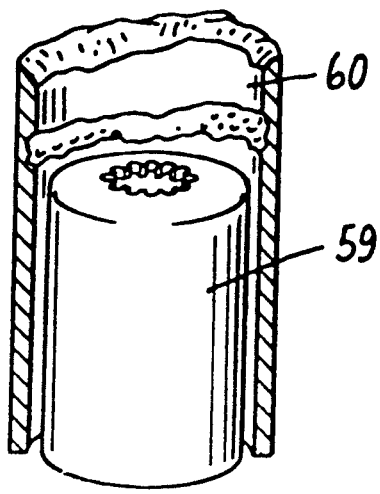
FIG. 8 is a partial perspective view similar to FIG. 6 illustrating erosion of the nozzle unit and the protective pipe by eddy currents operating on the inside of the pipe without the inner lining of the present invention.

FIG. 8 illustrates the negative effect of such an arrangement wherein it has been noted that erosion starts from the inside of the pipe 60 (shown in partial section) and nothing happens to the outside of the shroud. It is suspected that eddy currents near the tip of the nozzle unit 59 and pressure fluctuations have caused pulsation of the stream and a small quantity of catalyst has found its way into the nozzle unit 59 around the vena contracta of the liquid flow. The catalyst particles are swirled by the high speed stream and impact on the inside wall of the pipe to erode it away.

It should also be observed that inside erosion seems to be more severe on the top and the bottom of the shroud pipe 60 than on the sides. This is believed to be due to the flow patterns of the fluid with the catalyst stream upon which it impinges. It is important to note that the outside of the nozzle unit 59 is essentially free of erosion until a significant part of the protective pipe 60 is eroded away. The instant invention provides a solution to the subject problem by providing, as seen in FIG. 3, a fluidized catalytic cracking nozzle assembly 20 having a nozzle unit 59 within pipe 60 to dispose the discharge of nozzle unit 59 within the catalyst stream, pipe 60 is concentric about the nozzle unit 59 and includes shield means 62 on the inside thereof to protect the inside of the pipe from the destructive eddy currents. It is understood that the instant invention thus provides the additional method step of concentrically surrounding the square-edge orifice and around the fluid stream forming the vena contracta of fluid so that such flow from the orifice will be unobstructed until it is well outside the pipe. It also includes the further method step of protecting the inside of the pipe against eddy currents that may be created by such a fluid stream by providing abrasion resistant shield means on the inside of the pipe.

Specifically, the invention provides a FCC nozzle assembly 20 comprising a nozzle unit shown generally at 59 having a liquid hydrocarbon feed conduit 66, a discharge orifice 54 and a swirl chamber 51 positioned therebetween, said discharge orifice 54 having a square-edge 55 capable of creating a vena contracta 63 of liquid that may flow therethrough that is smaller in cross-sectional area than the area of said orifice 54. The nozzle unit 59 also has a plurality of stationary members in the form of vanes 53 or the like between the feed conduit 66 and chamber 51 for imparting centrifugal rotation to liquid that may flow therethrough, said discharge orifice 54 being smaller in diameter and substantially shorter in length than said swirl chamber 51, both said orifice 54 and said chamber 51 being open for full flow throughout the full cylindrical volumes thereof. The assembly also provides a cylindrical opening in the riser wall or a protective pipe 21 concentric with the nozzle unit 59, the unit 59 being recessed within the pipe 21 a distance such that the vena contracta 63 of the hydrocarbon feed, as a confined stream with or without steam, created by the pressure and fluid flow rate will flow through the length of protective pipe 21 the distance D in FIG. 3 before it disperses into a fine mist. The distance that the nozzle unit 59 is recessed is defined as the pipe height S. This distance is shown to be the distance from the outer cylindrical surface 58 of the end wall 56 to the end of the protective pipe 21. The pipe height S is shown to be less than the dimension D indicated above. As discussed earlier, the pipe height S may also be greater than the dimension D when the nozzle unit is further recessed as shown in phantom in FIG. 3. The protective pipe 21 also includes abrasion resistant shield means 62 on the inside thereof to protect the inside of the pipe 21.

The shield means 62 preferably extends within the pipe for substantially the distance of the pipe height S. As seen in FIG. 3, the shield means 62 more preferably extends a distance greater than the pipe height S and most preferably to the point where the nozzle unit is attached to the protective pipe base at 68. When the shield means 62 extends to the point of attachment of the nozzle unit 59 the entire surface of the nozzle is protected. In this arrangement the inside erosion at both the top and the bottom of the pipe is prevented, which in turn protects the complete nozzle.

The shield means 62 may be a protective coating or hardfacing formed on the steel walls of pipe 60, but is preferably a ceramic material or insert. Since it has been discovered that only one side of the pipe need be protected, i.e., on the inside, it is possible to use a brittle but hard material such as a ceramic for shield means 62. Ceramic is preferred since it is more erosion-resistant than either plain metal such as Type 304 stainless steel or carbon steel or metallic coatings. In addition, it is possible to make a ceramic insert that is much thicker than a coating. Aside from thickness, it is believed that a ceramic material such as a silicon nitride material is an order of magnitude more erosion-resistant than the best hardfacings. In addition, the ability to fabricate a ceramic insert for a shield means 62 allows the ceramic, as noted above, to be an order of magnitude thicker than a hardfacing. It is believed that such a ceramic type shield means 62 will allow the nozzle assembly to operate without failure for prolonged periods.

Pipe height S is also important in that if the pipe is too short it may not provide adequate protection for the nozzle unit 59. On the other hand, if the pipe is too long, it will restrict the essential disperson angle of the fluid stream in the flowing catalyst particles and reduce the potential benefit of the nozzle unit 59. As noted above, an optimum position for the sharp-edged orifice to prevent eddy currents around the vena contracta is at a depth in the riser side wall opening or shroud such that the conical diameter of the dispersing feed is approximately equal to the diameter of the opening or shroud.

Although the preferred embodiment of the present invention has been illustrated and described, it will be obvious to one skilled in the art that various changes may be made to the structure shown without departing from the spirit of the claimed invention.

What is claimed is:

1. In a riser reactor of a fluid catalytic cracking system having a feed nozzle for introducing a conically dispersed feed stream of liquid hydrocarbons from within a cylindrical opening through a side wall of said riser reactor to contact a fluidized stream of heated catalyst particles flowing therein for reaction with said liquid hydrocarbons which comprises:

said nozzle having a liquid hydrocarbon feed conduit inlet, a discharge orifice and a swirl chamber positioned therebetween, said discharge orifice being formed in an end wall of said swirl chamber and having a square-edge capable of creating a vena contracta of liquid that may flow therethrough smaller in cross-sectional area than the discharge area of said orifice, said discharge orifice being smaller in diameter and substantially shorter than said swirl chamber, a plurality of vanes between said feed conduit inlet and said swirl chamber for imparting centrifugal rotation to liquid that may flow therethrough, both said orifice and said chamber being open for full flow throughout the full cylindrical volumes thereof whereby said liquid hydrocarbon feed flowing through said nozzle is formed into a vena contracta over a distance several times the diameter of said orifice so that said vena contracta diverges into a wide angle conical spray pattern beyond said cylindrical opening through said side wall of said riser reactor and into said fluidized stream of heated catalyst particles flowing therein, induced solely by flow of said liquid hydrocarbon feed through said vanes and without concurrent gas flow around said vena contracta to augment or prevent such divergence of flow within said cylindrical opening, the improvement comprising:

a protective pipe having a cylindrical bore concentrically surrounding said nozzle and extending axially forward from at least said square-edge orifice of said nozzle into the heated catalyst flow path of said riser reactor pipe of said fluid catalytic cracking system, said protective pipe preventing breakup of the vena contracta formed solely by the liquid feed stream through said square edge orifice before entry into said fluidized stream of heated catalyst particles flowing through said riser reactor, the discharge end of said protective pipe terminating at a distance less than the distance at which said vena contracta diverges into said wide angle dispersion pattern, and shield means for preventing erosion of said orifice of said nozzle by eddy currents of catalyst particles induced within the annular space between said vena contracta and said cylindrical bore of said protective pipe comprising an abrasion resistant surface extending parallel to said vena contracta and along said cylindrical bore of said protective pipe from at least said orifice to said discharge end of said protective pipe.

2. In a riser reactor of a fluid catalytic cracking system in accordance with claim 1 wherein said nozzle unit is recessed within said pipe and said abrasion resistant surface of said shield means comprises a cylindrical annular ceramic insert covering the inner surface of said pipe and extending from said discharge end of said pipe to a depth greater than the recessed depth of said nozzle orifice in said pipe.

3. In a riser reactor of a fluid catalytic cracking system in accordance with claim 2 wherein said ceramic insert is formed of a silicon nitride material.

4. In a fluid catalytic cracking system wherein heated catalyst is fluidized for circulation through a reactor tube for contact with a liquid hydrocarbon feed stream, said liquid hydrocarbon feed stream being introduced into said reactor tube by at least one feed nozzle without requiring a concurrent flow of gas to confine or disperse said liquid as a spray into said fluidized catalyst, said feed nozzle including a discharge orifice substantially smaller in diameter and shorter in length than a swirl chamber between said orifice and a liquid hydrocarbon feed pipe, said orifice having a square edge capable of forming a vena contracta of liquid passing through said swirl chamber for dispersion into said stream of heated catalyst flowing through said reactor tube, said swirl chamber including vane means for imparting centrifugal rotation to fluid passing therethrough and through said vena contract to create a wide angle conical dispersion of liquid into said reactor tube, a hydrocarbon feed pipe extending through the side wall of said reactor tube to said nozzle, and said nozzle orifice being positioned within a blind cylindrical passageway having an opening only into said reactor tube to prevent contact of said liquid hydrocarbon feed from said orifice by said stream of heated catalyst particles before dispersion of said hydrocarbon feed stream in said vena contracta into said wide angle conical volume solely by flow of said liquid hydrocarbon feed stream through said nozzle unit, the improvement comprising:

a solid cylindrical protective pipe surrounding said nozzle to form said blind cylindrical passageway, said pipe extending generally co-axially and parallel with the vena contracta from at least said square-edge discharge orifice to substantially the point of dispersion of the vena contracta portion of the liquid feed stream into said wide angle conical volume for contact with said catalyst stream, and cylindrical shield means extending along and parallel with at least the inner cylindrical surface of said protective pipe, said shield means having a constant diameter along said vena contracta to prevent erosion of the interior of said pipe by eddy currents of catalyst particles induced in the annular space between said cylindrical inner surface of said pipe and said vena contracta by flow of said liquid feed stream therethrough and catalyst particles entrained in the vaporized hydrocarbons forming the reactant stream in said reactor tube.

5. In a fluid catalytic cracking system in accordance with claim 4 wherein said shield means comprises an annular ceramic insert extending axially over said inner cylindrical surface of said protective pipe from said discharge orifice to the open end of said protective pipe.

6. In a fluid catalytic cracking system in accordance with claim 5, wherein said annular ceramic insert is formed of silicon nitride.

* * * * *